United States Patent
Yankovich et al.

(10) Patent No.: US 11,115,492 B2
(45) Date of Patent: Sep. 7, 2021

(54) METHODS AND SYSTEM FOR DETERMINING PARAMETERS FOR A PRODUCT BASED ON ANALYSIS OF INPUT MEDIA

(71) Applicant: eBay, Inc., San Jose, CA (US)

(72) Inventors: Steve Yankovich, San Jose, CA (US); Sergio Pinzon Gonzales, Jr., San Jose, CA (US)

(73) Assignee: eBay, Inc., San Jose, CA (US)

( * ) Notice: Subject to any disclaimer, the term of this patent is extended or adjusted under 35 U.S.C. 154(b) by 42 days.

(21) Appl. No.: 16/040,351

(22) Filed: Jul. 19, 2018

(65) Prior Publication Data

US 2019/0251616 A1 Aug. 15, 2019

Related U.S. Application Data

(60) Provisional application No. 62/630,192, filed on Feb. 13, 2018.

(51) Int. Cl.
*G06Q 30/06* (2012.01)
*G06Q 30/02* (2012.01)
(Continued)

(52) U.S. Cl.
CPC ........ *H04L 67/306* (2013.01); *G06F 16/9535* (2019.01); *G06K 9/00335* (2013.01);
(Continued)

(58) Field of Classification Search
CPC ...................... G06Q 10/0639; G06Q 30/0631
See application file for complete search history.

(56) References Cited

U.S. PATENT DOCUMENTS 6,266,649 B1 7/2001 Linden et al.
7,987,182 B2 7/2011 Slothouber et al.
(Continued)

FOREIGN PATENT DOCUMENTS

CN 105867610 A 8/2016
WO 2007055618 A2 5/2007
(Continued)

OTHER PUBLICATIONS

Graham Thomas, Rikke Gade, Thomas B. Moeslund, Peter Carr, Adrian Hilton, Computer vision for sports: Current applications and research topics, Apr. 26, 2017, vol. 159, pp. 3-18 (Year: 2017).*
(Continued)

*Primary Examiner* — Brittney N Miller
(74) *Attorney, Agent, or Firm* — FIG. 1 Patents

(57) ABSTRACT

An enhanced product recommendation service observes a user engaging in an activity to automatically recommend products that facilitate performance of the activity. Photographs and/or video of the user performing the activity may be analyzed to identify an output that results from the activity and/or an activity task sequence that includes multiple tasks associated with completing the activity. Then, the enhanced product recommendation service may identify a product that is usable to generate the output(s) of the activity and/or complete the activity without performing one or more individual tasks of the activity task sequence. The product may be an existing product. Alternatively, the product may be a customized product that is designed based on observing the user engage in the activity. Physical measurements of the customized product may be determined based on various measurements determined by analyzing the photographs and/or video of the user performing the activity.

20 Claims, 8 Drawing Sheets

(51) Int. Cl.
*H04L 29/08* (2006.01)
*G06N 20/00* (2019.01)
*G06Q 50/04* (2012.01)
*G06K 9/00* (2006.01)
*G06F 16/9535* (2019.01)
*G06Q 10/08* (2012.01)
*G06Q 50/00* (2012.01)

(52) U.S. Cl.
CPC ..... *G06K 9/00577* (2013.01); *G06K 9/00671* (2013.01); *G06N 20/00* (2019.01); *G06Q 10/083* (2013.01); *G06Q 30/0202* (2013.01); *G06Q 30/0241* (2013.01); *G06Q 30/0256* (2013.01); *G06Q 30/0603* (2013.01); *G06Q 30/0621* (2013.01); *G06Q 30/0627* (2013.01); *G06Q 30/0631* (2013.01); *G06Q 30/0641* (2013.01); *G06Q 30/0643* (2013.01); *G06Q 50/04* (2013.01); *H04L 67/22* (2013.01); *G06Q 50/01* (2013.01)

(56) References Cited

U.S. PATENT DOCUMENTS

| | | | |
|---|---|---|---|
| 8,219,438 | B1 | 7/2012 | Moon et al. |
| 8,775,230 | B2 | 7/2014 | Casas et al. |
| 8,787,707 | B1 | 7/2014 | Steves et al. |
| 8,805,838 | B1 | 8/2014 | Khoshnevisan et al. |
| 9,304,332 | B2 | 4/2016 | Fonte et al. |
| 9,330,407 | B2 | 5/2016 | Beaver et al. |
| 9,454,780 | B2 | 9/2016 | Paul et al. |
| 9,652,797 | B2 | 5/2017 | Vijayaraghavan et al. |
| 9,760,935 | B2 | 9/2017 | Aarabi |
| 10,798,211 | B2 | 10/2020 | Yankovich et al. |
| 2005/0177453 | A1 | 8/2005 | Anton et al. |
| 2008/0004951 | A1 | 1/2008 | Huang et al. |
| 2008/0033939 | A1 | 2/2008 | Khandelwal |
| 2008/0222119 | A1 | 9/2008 | Dai et al. |
| 2009/0259687 | A1* | 10/2009 | Do ..................... G06F 16/9535 |
| 2010/0185309 | A1 | 7/2010 | Ohiaeri et al. |
| 2011/0184806 | A1 | 7/2011 | Chen et al. |
| 2012/0050529 | A1* | 3/2012 | Bentley .............. G06K 9/00342 348/139 |
| 2012/0109777 | A1 | 5/2012 | Lipsitz et al. |
| 2012/0231840 | A1* | 9/2012 | Calman .............. G06K 9/00342 455/556.1 |
| 2013/0190903 | A1 | 7/2013 | Balakrishnan et al. |
| 2014/0193001 | A1 | 7/2014 | Oishi |
| 2014/0279180 | A1 | 9/2014 | Beaver et al. |
| 2014/0316995 | A1 | 10/2014 | Paul et al. |
| 2015/0066644 | A1 | 3/2015 | Narasimhan et al. |
| 2015/0101134 | A1 | 4/2015 | Manz et al. |
| 2015/0154322 | A1 | 6/2015 | Fonte et al. |
| 2015/0186970 | A1 | 7/2015 | Holman et al. |
| 2015/0220566 | A1 | 8/2015 | Cumming et al. |
| 2015/0248473 | A1 | 9/2015 | Kenedy et al. |
| 2015/0339757 | A1* | 11/2015 | Aarabi .................. G06Q 30/06 705/12 |
| 2016/0051078 | A1* | 2/2016 | Jenkins ..................... F24C 3/12 99/331 |
| 2016/0335667 | A1 | 11/2016 | Aubrey |
| 2017/0278135 | A1 | 9/2017 | Majumdar et al. |
| 2017/0337611 | A1 | 11/2017 | Hsiao et al. |
| 2019/0073697 | A1 | 3/2019 | Varley |
| 2019/0251613 | A1 | 8/2019 | Yankovich et al. |
| 2019/0253514 | A1 | 8/2019 | Yankovich et al. |
| 2020/0404072 | A1 | 12/2020 | Yankovich et al. |

FOREIGN PATENT DOCUMENTS

| | | |
|---|---|---|
| WO | 2017011811 A1 | 1/2017 |
| WO | 2019/160601 A1 | 8/2019 |
| WO | 2019/160602 A1 | 8/2019 |
| WO | 2019/160603 A1 | 8/2019 |

OTHER PUBLICATIONS

International Search Report received for PCT Application No. PCT/US2018/065644, dated Feb. 27, 2019, 4 pages.
International Search Report received for PCT Application No. PCT/US2018/065659, dated Mar. 6, 2019, 3 pages.
International Search Report received for PCT Application No. PCT/US2018/065670, dated Mar. 6, 2019, 3 pages.
International Written Opinion received for PCT Application No. PCT/US2018/065644, dated Feb. 27, 2019, 7 pages.
International Written Opinion received for PCT Application No. PCT/US2018/065659, dated Mar. 6, 2019, 6 pages.
International Written Opinion received for PCT Application No. PCT/US2018/065670, dated Mar. 6, 2019, 6 pages.
Non-Final Office Action Received for U.S. Appl. No. 16/040,391, dated Mar. 4, 2020, 10 pages.
Response to Restriction Requirement filed on Aug. 17, 2020 for U.S. Appl. No. 16/040,369, dated Jun. 15, 2020, 13 pages.
Restriction Requirement Received for U.S. Appl. No. 16/040,369, dated Jun. 15, 2020, 7 pages.
Notice of Allowance received for U.S. Appl. No. 16/040,391, dated Jun. 18, 2020, 5 pages.
Response to Non-Final Office Action filed on Jun. 4, 2020 for U.S. Appl. No. 16/040,391, dated Mar. 4, 2020, 18 Pages.
International Preliminary Report on Patentability received for PCT Application No. PCT/US2018/065644, dated Aug. 27, 2020, 9 Pages.
International Preliminary Report on Patentability received for PCT Application No. PCT/US2018/065659, dated Aug. 27, 2020, 8 pages.
International Preliminary Report on Patentability received for PCT Application No. PCT/US2018/065670, dated Aug. 27, 2020, 8 pages.
Non-Final Office Action received for U.S. Appl. No. 16/040,369, dated Jan. 8, 2021, 16 pages.
Final Office Action Received for U.S. Appl. No. 16/040,369, dated Jun. 1, 2021, 22 Pages.

* cited by examiner

METHODS AND SYSTEM FOR DETERMINING PARAMETERS FOR A PRODUCT BASED ON ANALYSIS OF INPUT MEDIA

PRIORITY APPLICATION

This application claims the benefit of and priority to U.S. Provisional Application No. 62/630,192, filed Feb. 13, 2018, the entire contents of which are incorporated herein by reference.

BACKGROUND

Some services are designed for seamless integration into an environment for streamlining tasks that a user sets out to perform. For example, a smart speaker may be physically introduced into an environment to receive questions from the user and, ultimately, to provide appropriate responses back to the user in real time. Some smart speakers include cameras for facilitating video calls or even observing the user's clothing to provide fashion advice using various fashion-based machine learning algorithms. Generally, these services provide the user with information only in response to specific questions that are asked by the user. For example, the user may ask a question about a cooking measurement to prompt the smart speaker to provide the user with some knowingly desired piece of information. Thus, by enabling the user to verbally ask the question, the smart speaker streamlines the task of learning the cooking measurement (e.g., verbally asking the question is streamlined as compared to manually looking the information up on the internet).

Unfortunately, under a variety of circumstances the user may perform a task without knowledge of a product that is designed to make the performance of the task easier. For example, the user may manually convert a raw material into a finished product without knowledge of a product that is specifically designed to reduce the time and/or effort required to create the finished product. Under other circumstances, the user may perform a task that could potentially be performed more easily if a product, which does not yet exist, were customized with respect to the task.

All too often, subsequent to and/or during performance of a task in an inefficient manner, users are lured into accessing an internet browser service and generating exorbitant numbers of search queries in a quest to identify product(s) for improving the ease of performing the task. Under circumstances where such a product does not yet exist, the network traffic generated by these browsing activities is without values. Therefore, existing product recommendation services fail to mitigate the issue of wasteful usage of computing resources that frequently results from aimless and fruitless quests for non-existent products.

It is with respect to these and other considerations that the disclosure made herein is presented.

SUMMARY

Technologies described herein enable an enhanced product recommendation service to automatically recommend products to a user based on observations taken of the user engaging in an activity. In some embodiments, user activity is monitored such as, for example, by taking photos or video of a user engaging in an activity. For instance, photos or video might be captured of a user cooking a meal or interacting with an electronic device like a phone.

The observed activity can be analyzed using artificial intelligence ("AI") techniques to identify one or more tasks that the user is performing (e.g. taking a "selfie" with their phone or cooking a meal). An amount of time for completion of the tasks can also be determined. AI techniques can then also be utilized to generate parameters for a new product that can be utilized to reduce the number of tasks required to complete the activity or to reduce the amount of effort required to complete the tasks. For example, parameters for a selfie stick of a certain length might be generated based upon the observed manner in which a user takes a selfie. As another example, parameters for a phone case with a shutter release button in a specific location might be generated based upon the manner in which the user takes photos with their phone. A product can then be manufactured according to the generated parameters. A recommendation can also be provided to a user for an existing product that can reduce the number of tasks required to complete the activity or reduce the amount of effort required to complete the tasks. The manufactured or recommended product can also be provided to the user preemptively (i.e. without the user ordering or otherwise requesting the product).

By preemptively informing a user of products that can improve their ability to perform certain tasks, the techniques described herein diminish the lure that users often succumb to aimlessly entering search queries to wander from web-page to web-page in search of obscure or, worse yet, non-existent products. Therefore, implementations of the techniques described herein effectively reduce network bandwidth and consumption of other computer resources such as, for example, processor cycles and memory that inherently results from submission of search queries to a web-based search engine.

Some embodiments analyze input media received from various sources to identify an output that results from the activity and/or an activity task sequence that includes multiple tasks associated with completing the activity. As a specific but nonlimiting example, the input media may include photographs and/or video taken of the user operating a kitchen knife to manually cut raw potatoes into French fries (e.g., elongated rectangular sticks). In this example, the enhanced product recommendation service may analyze the input media to identify that the user is producing French fries as an output of an activity. Additionally, or alternatively, in this example, the enhanced product recommendation service may identify that the user is performing an activity task sequence including certain tasks such as obtaining a raw material (e.g., whole potatoes), cutting the raw material into an intermediary output (e.g., potato slices of uniform thickness), and then cross cutting the intermediary output into a final output (e.g., French fries).

Then, based on having identified the activity task sequence being performed by the user and/or the output(s) of the activity (e.g., the intermediary output and/or the final output), the enhanced product recommendation service may identify a product (e.g., an existing product and/or a custom product that is not yet made) that is usable to generate the output(s) of the activity and/or complete the activity without performing one or more individual tasks of the activity task sequence. In various implementations, a product recommendation may then be generated to inform the user of aspects (e.g., price, features, user testimonials, etc.) of the identified product. Additionally, or alternatively, the identified product may be preemptively delivered to the user (e.g., delivered to the user without being expressly ordered by the user).

In an exemplary implementation, the enhanced product recommendation service may identify an existing product that is usable in association with an activity that the user is observed as performing. For example, continuing with the scenario in which the input media is of the user manually cutting French fries, the enhanced product recommendation service may identify an existing product (e.g., a mandolin slicer that is available from an online retailer) that is specifically designed for converting the raw material (e.g., whole potatoes) into the output (e.g., French fries).

In order to observe the user performing an activity, the enhanced product recommendation service may receive input media that defines a graphical representation of a user engaging in the activity. For example, the input media may include photographs and/or video that are captured by a virtual assistant device (e.g., an AMAZON ECHO LOOK smart speaker connected to AMAZON ALEXA, an APPLE IPHONE smart phone connected to APPLE SIRI, etc.) that is set up in an environment where the user performs the activity and is configured to communicate with an artificial intelligence based virtual assistant service (e.g., AMAZON ALEXA, APPLE SIRI, etc.). The enhanced product recommendation service may then analyze the input media to identify a wide variety of characteristics associated with the activity being performed by the user. For example, the enhanced product recommendation service may deploy machine learning techniques to implement an image recognition model for determining one or more characteristics of the activity that can be identified from analyzing the photographs and/or video captured by the virtual assistant device.

In some implementations, the enhanced product recommendation service may identify raw material characteristics associated with one or more raw materials that the user is using to perform the activity. For example, the enhanced product recommendation service may analyze the input media to identify one or more materials that are graphically represented within the input media. Then, the enhanced product recommendation service may determine whether the one or more "identified" materials are being used as an input for the activity. In some implementations, the enhanced product recommendation service may deploy machine learning to implement the image recognition model for identifying different materials that are included within the photographs and/or video captured by the virtual assistant device. For example, continuing with the scenario in which the input media is of the user manually cutting French fries, the enhanced product recommendation service may use the image recognition model to identify that whole potatoes are shown within the input media. Based on the user interacting with an identified material, the enhanced product recommendation engine may determine whether the identified material is a raw material that is being used as an input for the activity.

In some implementations, the enhanced product recommendation service may identify output characteristics associated with one or more outputs that are produced during performance of the activity by the user. For example, the enhanced product recommendation service may analyze the input media to identify one or more products that are graphically represented within the input media. Then, the enhanced product recommendation service may determine whether the one or more products are produced as a result of the activity. For example, if a product does not exist when the user begins to perform the activity but rather is recognized by the enhanced recommendation service only after the user has performed one or more individual tasks of the activity task sequence, the enhanced product recommendation service may determine (e.g., infer and/or conclude) that the product is produced as a result of the activity. Stated differently, the enhanced product recommendation service may determine that the product is an output of the user performing the activity. In some implementations, the enhanced product recommendation service may implement the image recognition model to identify different outputs that are being produced within the photographs and/or video captured by the virtual assistant device. For example, continuing with the scenario in which the input media is of the user manually cutting French fries, the enhanced product recommendation service may use the image recognition model to identify that French fries are being produced within the input media.

In some implementations, the enhanced product recommendation service may identify task sequence characteristics associated with one or more tasks performed by the user during performance of the activity. For example, the enhanced product recommendation service may analyze the input media to identify one or more tasks that are being performed by the user in the input media (e.g., within a photograph and/or video of the user). In some implementations, tasks that are being performed by the user may be identified based on one or more items of equipment that are graphically represented within the input media. For example, the enhanced product recommendation service may determine that the user is performing a series of cutting tasks based on identifying that the user is manipulating a kitchen knife. In some implementations, tasks that are being performed by the user may be identified based on movements performed by the user with respect to an identified item of equipment, an identified raw material, and/or an identified output. For example, continuing with the scenario in which the input media is of the user manually cutting French fries, the enhanced product recommendation service may determine that the user is performing the series of cutting tasks based on identifying that the user grips a whole potato (e.g., raw material) with a left hand while manipulating a kitchen knife (e.g., equipment) with a right hand to generate French fries (e.g., output).

Based on the characteristics that are associated with the activity and identified by analyzing the input media of the user engaging in the activity, the enhanced product recommendation service may determine an existing product that is usable in association with the activity. In some implementations, the enhanced product recommendation service may analyze product data that is associated with one or more retail services to identify an existing product that is usable for generating an output that results from the activity. For example, based on identifying that the user is slicing whole potatoes into conventionally shaped French fries, the enhanced product recommendation service may identify an existing mandolin slicer that is specifically designed for converting whole potatoes into conventionally shaped French fries. In some implementations, the enhanced product recommendation service may identify multiple different existing products that are usable in association with the activity. For example, based on identifying that the user is slicing whole potatoes into conventionally shaped French fries, the enhanced product recommendation service may identify both of the mandolin slicer and a lever-operated restaurant quality French fry cutter.

In various implementations, a product recommendation may then be generated to recommend the product to the user and/or to inform the user of parameters (e.g., price, features, user testimonials, etc.) of the identified product. Generally, the product identified is designed to improve the user's ability to easily perform the activity by, for example, reducing the amount of time the activity takes, improving ergonomics of performing the activity, increasing an output rate of the activity, eliminating a need to perform one or more tasks of a determined activity task sequence, etc. For example, in response to analyzing the input media and determining that the user is manually cutting French fries, the enhanced product recommendation service may transmit a product recommendation to a virtual assistant device and/or user device associated with the user. An exemplary product recommendation may inform the user of the product and/or benefits of using the product as opposed to performing the activity in the manner observed via the input media. Additionally, or alternatively, one or more identified products may be delivered to the user preemptively (e.g., delivered to the user without being expressly ordered by the user).

In another exemplary implementation, the enhanced product recommendation service may determine product customization parameters for generating a custom product that is specifically designed based on analyzing the input media. For example, a customized product can be designed based on various characteristics of the activity that are identified by analyzing the input media. The product customization parameters may be determined based on output characteristics that indicate a specific shape and/or specific dimensions of an output that results from the activity. As a specific but non-limiting example, consider a scenario in which the output of the activity is substantially uniformly dimensioned triangularly-shaped potato slices. In this example, the enhanced product recommendation service may identify the shape and dimensions of the output potato slices and may generate product customization parameters for generating a custom product that is specifically designed to generate substantially similar potato slices to those manually created by the user.

In some implementations, the enhanced product recommendation service may schedule a preemptive delivery of the custom product to the user (e.g., at a physical address of the user such as the home and/or office). In this way, the enhanced product recommendation service enables the user to receive products that are specifically customized to assist with an activity that the user has been performing in a preemptive manner such that the user has neither ordered nor even expressed and/or contemplated a desire for the custom product. In various implementations, a notification may be generated to inform the user that a preemptive delivery has been scheduled and to provide the user with the ability to cancel the preemptive delivery (e.g., to avoid being provided with and/or charged for the custom product).

AI may alternatively be utilized to generate one or more behavioral recommendations to provide to the user to optimize performance of the task by simply modifying the user's behavior in performing the task. This modified behavior is typically more efficient and/or less dangerous than the user's current behavior, and may be used instead of, or in the interim of receiving the ordered/customized product.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

The following Detailed Description describes technologies that enable an enhanced product recommendation service to automatically recommend products to a user based on observations taken of the user engaging in an activity. Generally described, some embodiments analyze input media of a user engaging in an activity to identify an output that results from the activity and/or an activity task sequence that includes multiple tasks associated with completing the activity. Then, based on having identified the activity task sequence being performed by the user and/or the output(s) of the activity, various embodiments identify a product (e.g., an existing product and/or a custom product that is not yet made) that is usable to generate the output(s) of the activity and/or complete the activity without performing one or more individual tasks of the activity task sequence. In various implementations, a product recommendation may then be generated to inform the user of aspects (e.g., price, features, user testimonials, etc.) of the identified product. Additionally, or alternatively, the identified product may be preemptively delivered to the user (e.g., delivered to the user without being expressly ordered by the user).

The disclosed techniques are believed to be applicable to a variety of scenarios in which a computing device such as a virtual assistant and/or smart phone can generate media of a user engaging in an activity and then provide that media to the enhanced product recommendation service (e.g., via a network connection). Aspects of the techniques disclosed below are predominantly described in the context of several specific examples which are provided for illustrative purposes only. For example, aspects are described in the context of a user converting a raw material into a finished product (e.g., cutting French fries) and/or a user performing an activity which does not result in any tangible material conversion (e.g., juggling). Various aspects of the disclosed techniques are, however, widely applicable to other scenarios. Thus, it can be appreciated that any other scenario that is suitable for observing a user via an electronic device (e.g., a camera on a virtual assistant) and then identifying a product that can assist with the activity is within the scope of the present disclosure.

Figure 1:
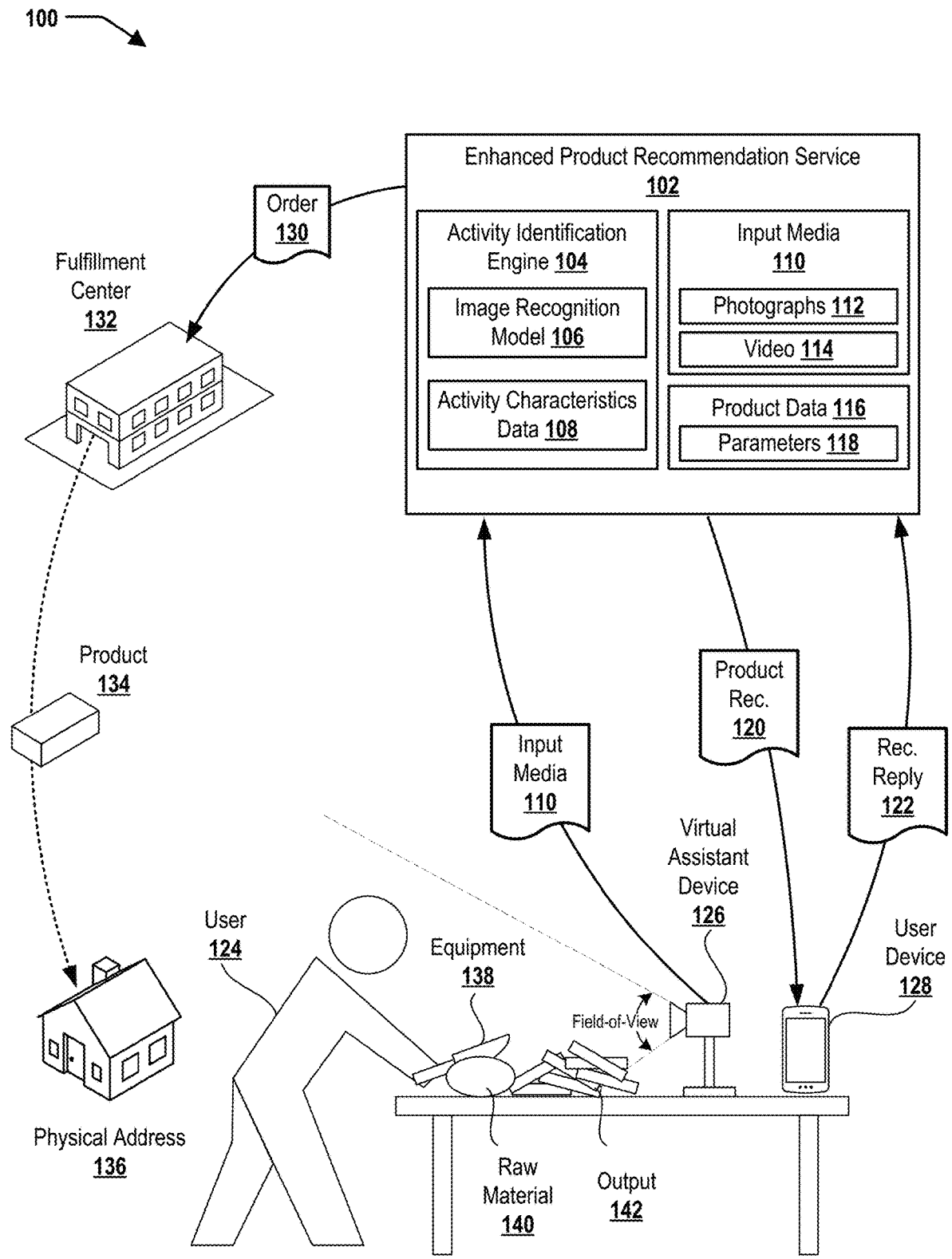
FIG. 1 illustrates an exemplary system for analyzing input media of a user engaging in an activity to determine the activity being performed and to then identify a product that is usable in association with the activity.

Turning now to FIG. 1, illustrated is an exemplary system 100 for analyzing input media 110 of a user 124 engaging in an activity to determine the type of activity being performed and to then identify a product 134 that is usable in association with the activity. As illustrated, the system 100 may include an electronic device (e.g. a smartphone and/or a virtual assistant device) that is set up within a physical environment to observe the user 124 engaging in an activity. For purposes of the discussion of FIG. 1, the user 124 is shown to be working on (e.g., slicing, etc.) a raw material to convert the raw material from a raw form to a finished form. More specifically, the user 124 is shown to be using a kitchen knife to slice whole potatoes into French fries. In the illustrated example, the input media 110 is being generated by a virtual assistant device 126 that is configured with a camera for generating photographs 112 and/or video 114 of a field of view (outlined in dashed lines). The virtual assistant device 126 is further configured to transmit the input media 110 to the enhanced product recommendation service 102 for analysis in accordance with the techniques disclosed herein. In some implementations, the enhanced product recommendation service 102 may be integrated into the virtual assistant device 126 such that the analysis of the input media 110 occurs at the same device which generated the input media 110. Exemplary virtual assistant devices include, but are not limited to, an AMAZON ECHO LOOK smart speaker connected to AMAZON ALEXA, an APPLE IPHONE smart phone connected to APPLE SIRI, or any other type of electronic device suitable for observing the user 124 engage in an activity.

The enhanced product recommendation service 102 may include an activity identification engine 104 that is configured to deploy an image recognition model 106 to determine activity characteristics data 108 associated with the activity the user 124 is engaging in. The activity identification engine 104 may utilize various machine learning techniques and/or "artificial intelligence" techniques to analyze the input media 110. In some embodiments, the image recognition model 106 may be created by employing supervised learning techniques wherein one or more humans assist in generating training data associated with identifying the activity and/or characteristics of the activity. For example, a human reviewer may manually analyze various instances of input media 110 and label certain instances as corresponding to certain activities. As another example, a human reviewer may label certain instances as corresponding to a particular product (e.g., a product usable to assist with whatever activity is being performed in that instance of input media 110). The human reviewer may examine an instance of input media 110 and determine that an observed user is performing a slicing activity with respect to a particular type of raw material (e.g., a vegetable) and, based on this examination, the human reviewer may label this instance of input media 110 as corresponding to a particular type of equipment (e.g., a highly rated mandolin slicer).

Then, based on the training data, the activity identification engine 104 may update the image recognition model 106 and deploy the "updated" image recognition model 106 against new instances of input media 110. For example, using the "updated" image recognition model 106 to analyze the new instances of input media 110, the activity identification engine 104 may determine that a user is performing the same and/or a similar action to that previously observed and labeled by the human reviewer. Thus, the activity identification engine 104 may automatically (e.g., without a human reviewer's input) determine that the user in the new instance(s) of input media 110 is performing an activity that could be done more easily using the particular type of equipment (e.g., the highly rated mandolin slicer).

Additionally, or alternatively, other machine learning techniques may also be utilized, such as unsupervised learning, semi-supervised learning, classification analysis, regression analysis, clustering, etc. One or more predictive models may also be utilized, such as a group method of data handling, Naïve Bayes, k-nearest neighbor algorithm, majority classifier, support vector machines, random forests, boosted trees, Classification and Regression Trees (CART), neural networks, ordinary least square, and so on.

Deploying the activity identification engine 104 to analyze the input media 110 enables identification of a variety of characteristics associated with the activity being performed by the user 124. For example, the enhanced product recommendation service 102 may deploy machine learning techniques to analyze the photographs 112 and/or video 114 captured by the virtual assistant device 126 and, based thereon, to generate activity characteristics data 108 that indicates various characteristics of the activity that the user 124 is observed performing.

In some implementations, the enhanced product recommendation service 102 may generate activity characteristics data 108 that indicates raw material characteristics associated with raw material(s) 140 that are being used in performance of the observed activity. For example, the enhanced product recommendation service 102 may analyze the input media 110 to identify a material that is graphically represented within the input media 110 due to being within the field of view of the virtual assistant device 126. The enhanced product recommendation service 102 may then determine whether the "identified" material is being used as a material input for the activity. In some implementations, machine learning and/or artificial intelligence techniques may be deployed to implement the image recognition model 106 for identifying different materials that are represented within the photographs 112 and/or video 114. For example, in the illustrated example in which the user 124 is observed manually cutting French fries, the enhanced product recommendation service 102 may use the image recognition model 106 to identify that whole potatoes are shown within the input media 110.

Based on the user 124 interacting with an identified material, the enhanced product recommendation engine 102 may determine whether the identified material is a raw material that is being used as an input for the activity. In the illustrated example, because the user 124 is converting the whole potatoes into a different form (e.g., French fries), the enhanced product recommendation service 102 may determine that the whole potatoes are an input of the activity in the sense that the activity "consumes" the whole potatoes. In some implementations, a raw material may be specifically identified such that the raw material characteristics indicate the raw material with a high degree of specificity (e.g., by precise name such as Russet Burbank potato or Maris Piper potato). Additionally, or alternatively, a raw material may be generally identified such that the raw material characteristics indicate the raw material with a relatively lower degree of specificity (e.g., by a vegetable classification such as Root vegetables or Bulb vegetables).

As used herein, the term "raw material" refers broadly to any material that is worked upon during an activity to be converted from a raw form to a finished form. For example, whole potatoes may be worked upon (e.g., sliced) by the user 124 for conversion into French fries. As another example, fresh paint may be worked upon (e.g. applied via a brush and/or roller) by the user 124 for conversion into a paint layer that is adhered to a wall.

In some implementations, the enhanced product recommendation service 102 may generate activity characteristics data 108 that indicates output characteristics associated with an output 142 that results from the user 124 performing the activity. For example, the enhanced product recommendation service 102 may analyze the input media 110 to identify a product that is graphically represented within the input media 110 due to being within the field of view of the virtual assistant device 126. The enhanced product recommendation service 102 may then determine whether the product is produced as a result of the activity. For example, under circumstances in which a human reviewer manually generates training data, the human reviewer may analyze instances of the input media 110 to label an identified product as an output of an activity. It can be appreciated that under many circumstances an output of an activity will not exist at the outset of the activity. For example, in the illustrated scenario the output 142 (e.g., French fries) will not exist until the user 124 has begun slicing the raw material 140 (e.g., whole potatoes). Thus, based on the human generated training data, the activity identification engine 104 may observe that a product is first identifiable only after the user 124 has begun performing aspects of an identified activity, and furthermore that the product is initially identified at a location within the field of view near where the user 124 is seen performing the aspects of the activity. For example, French fries may become unidentifiable one-by-one at the same location within the field of view as where the user 124 is observed manipulating a piece of equipment 138 (e.g., a Kitchen Knife). Then, based on the combination of these observations, the activity identification engine 104 may determine (e.g., infer and/or conclude) that the product is an output of the activity.

As used herein, the term "output" refers broadly to any tangible item that comes into existence as a result of a person performing a particular activity. For example, French fries (e.g., an output) may come into existence as a result of a person slicing whole potatoes (e.g. a particular activity). As another example, a paint layer may come into existence as a result of a person applying paint to a surface (e.g., a wall).

In some implementations, the enhanced product recommendation service 102 may generate activity characteristics data 108 that indicates task sequence characteristics associated with a task and/or series of tasks that are performed by the user 124 to complete the activity. For example, the enhanced product recommendation service 102 may analyze the input media 110 to identify task(s) that are being performed by the user 124 within the field of view of the virtual assistant device 126. In some implementations, one or more tasks performed by the user 124 may be identified based on equipment 138 that is graphically represented within the input media 110. For example, the enhanced product recommendation service 102 may determine that the user 124 is performing a series of cutting tasks based on identifying that the user 124 is manipulating a kitchen knife. In some implementations, tasks may be identified based on movements performed by the user 124 with respect to an identified item of equipment 138, an identified raw material 140, and/or an identified output 142. For example, continuing with the scenario in which the input media 110 is of the user 124 manually cutting French fries, the enhanced product recommendation service 102 may determine that the user 124 is performing the series of cutting tasks based on identifying that the user 124 grips a whole potato (e.g., raw material) with a left hand while manipulating a kitchen knife (e.g., equipment) with a right hand to generate French fries (e.g., output). As another example, the enhanced product recommendation service 102 may determine that the user 124 is performing a painting task based on identifying that the user 124 is manipulating a paint brush (e.g., equipment) with respect to a paint can (e.g., raw material) and a wall (e.g., raw material).

As used herein, the term "task sequence" refers broadly to any progression of one or more tasks that are identified as being performed by a user in association with a particular activity. An exemplary task sequence may include a first task of gripping a raw material 140, a second task of working on (e.g., cutting, shaping, stirring, kneading, heating, etc.) the raw material 140 with a piece of equipment 138, and/or a third task of moving an output 142 into a container (e.g., placing French fries into a bowl or fryer vat). In some instances, a task sequence may include repeating one or more individual steps (e.g., repeatedly cutting a raw material). For example, if the user 124 is creating the French fries one-by-one, then the user 124 will of course have to repeat the second task (e.g., working on the raw material 140) at least once for each individual French fry slice created.

Based on the activity characteristics data 108 that is determined in association with the activity the user 124 is engaging in, the enhanced product recommendation service 102 may identify a product 134 that is usable is association with the activity. Generally, the product 134 that is identified is designed to improve an ability to easily perform the activity by, for example, reducing the amount of time the activity takes, improving ergonomics of performing the activity, increasing an output rate of the activity, eliminating a need to perform one or more tasks of a determined activity task sequence, etc. In some implementations, the enhanced product recommendation service 102 may analyze product data 116 that may be associated with one or more retail services to identify an existing product that is usable for generating the output 142 that results from the activity. For example, based on identifying that the user 124 is slicing whole potatoes into conventionally shaped French fries, the enhanced product recommendation service 102 may identify an existing mandolin slicer that is specifically designed for (among other things) converting whole potatoes into conventionally shaped French fries. In some implementations, the enhanced product recommendation service 102 may identify multiple different existing products that are usable in association with the activity. For example, based on identifying that the user 124 is slicing whole potatoes into conventionally shaped French fries, the enhanced product recommendation service 102 may identify both a mandolin slicer and a lever-operated restaurant quality French fry cutter.

In various implementations, the enhanced product recommendation service 102 may determine parameters 118 associated with one or more products that are identified as being usable in association with the activity. Exemplary parameters 118 include, but are not limited to, product description data indicating a description of the product (e.g., a product-name, product-category, etc.), pricing data that indicates a cost of a product, versatility data that indicates whether a product can be adapted to different functionalities and/or activities, user review data indicating whether previous users have been satisfied with a product, output rate data indicating an amount of output a product can produce in a period of time (e.g., one-pound of French fries per one-minute), and/or any other parameter.

In various implementations, a product recommendation 120 may then be generated to recommend the product 134 to the user 124 and/or to inform the user 124 of parameters 118 (e.g., price, features, user testimonials, etc.) of the product 134. For example, in response to analyzing the input media 110 and determining that the user 124 is manually cutting French fries, the enhanced product recommendation service 102 may transmit a product recommendation 120 to the virtual assistant device 126 and/or user device 128 associated with the user 124. An exemplary product recommendation may inform the user 124 of the product 134 and/or benefits of using the product 134 as opposed to performing the activity in the manner observed via the input media 110. As a specific but non-limiting example, a product recommendation 120 could recite: "Hello, we recently noticed that you cut eight raw potatoes into French fries and that this took you about thirty minutes. We also notice that you make French fries twice a week (or some other periodicity). We would like to recommend these two products which could help you make French fries easier and faster. Product 1: Using this Mandolin slicer that costs $10, you could have sliced the eight raw potatoes into French fries in ten minutes. Product 2: Using this lever-operated restaurant quality French fry cutter that costs $30, you could have sliced the eight raw potatoes into French fries in one minute." Thus, it can be appreciated that in some implementations, the enhanced product recommendation service 102 may determine an amount of time that the user 124 spent to perform the observed activity in the manner graphically represented within the input media 110. The enhanced product recommendation service 102 may also determine an estimated amount of time that the user 124 could perform the activity and/or achieve the same result as the activity (e.g., generate a predetermined amount of output) using one or more identified products.

In some implementations, the product recommendation 120 may enable the user 124 to generate a recommendation reply 122 that indicates whether the user 124 would like to generate an order 130 for the product 134. For example, the product recommendation 120 may include a user interface element (e.g., a virtual button) that is selectable by the user 124 to cause the order 130 to be sent to a fulfillment center 132 that corresponds to a retail service (e.g., AMAZON. COM INC., JET.COM, etc.). Then, responsive to the order 130, the product 134 may be shipped directly from the fulfillment center 132 to a physical address 136 of the user 124 (e.g. a home and/or office of the user 124).

In some instances, the enhanced product recommendation service 102 may cause the product 134 to be shipped to the physical address 136 without sending the product recommendation 120 to the user 124 and/or receiving the recommendation reply 122 from the user 124. In a specific but nonlimiting example, the product recommendation 120 may include an indication of a preemptive delivery that has either been scheduled or will be scheduled without contrary instructions being received from the user 124. For example, the user 124 may send the recommendation reply 122 to instruct the enhanced product recommendation service 102 not to ship the product 134. Thus, if no action is taken by the user 124 in response to receiving the product recommendation 120, the product 134 may be automatically delivered to the user 124 even without the user 124 generating an order for the customized product 134.

Figure 2:
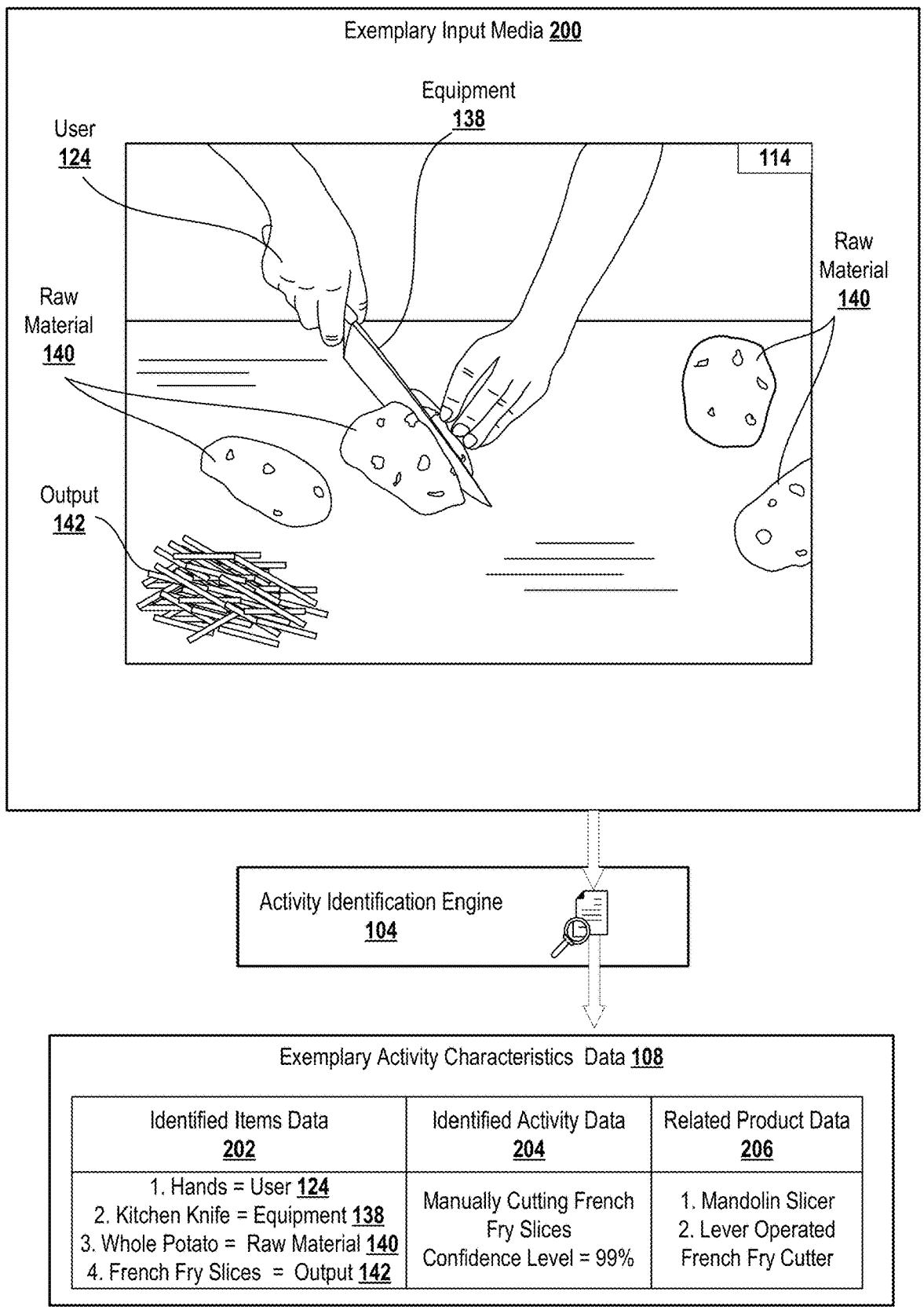
FIG. 2 illustrates exemplary input media that is suitable for analysis by an activity identification engine to determine exemplary activity characteristics data.

Turning now to FIG. 2, illustrated is exemplary input media 200 that is suitable for analysis by the activity identification engine 104 to determine exemplary activity characteristics data 108. The exemplary input media 200 may graphically represent a user 124 engaging in an activity. As illustrated, the exemplary input media 200 graphically represents the user 124 operating an item of equipment 138 for converting a raw material 140 into an output 142. In this example, the activity identification engine 104 analyzes the exemplary input media 200 which may include the video 114 that is generated by the virtual assistant device 126. By deploying machine learning techniques to analyze the video 114 using the image recognition model 106, the activity identification engine 104 identifies various items to generate identified items data 202. In the specifically illustrated but nonlimiting example, the activity identification engine 104 may identify each of whole potatoes, the hands of the user 124, a kitchen knife, and a pile of uncooked French fries. In some instances, the activity identification engine 104 may classify and/or label identified items. For example, as illustrated, the identified items data 202 includes labels that are individually associated with identified items. That is, the first identified item of "hands" is labeled as the user 124, the second identified item of "Kitchen Knife" is labeled as the equipment 138, etc.

In various implementations, the activity identification engine 104 may generate identified activity data 204 that indicates one or more activities that correspond to and/or are associated with the various identified items. For example, upon identification of the French fries, the activity identification engine 104 may analyze one or more databases to determine various information about French fries such as, for example, what they are made of, how they can be made, what types of equipment are used to make them, etc. In this specific example, the activity identification engine 104 may determine that French fries are made from potatoes. Then, based on having also identified the whole potatoes, the activity identification engine 104 may determine with some level of confidence that the user 124 is engaging in an activity to convert the whole potatoes into French fries.

Thus, in some instances, the activity identification engine 104 may infer an activity being performed by the user 124 simply from identifying one or more items within the exemplary input media 200. In other instances, the activity identification engine 104 may determine the activity being performed by the user 124 based on observations of how the user 124 is interacting with and/or manipulating one or more identified items. For example, in the illustrated example, the activity identification engine 104 may observe that the user 124 is manipulating a kitchen knife with respect to a whole potato in a manner that results in additional individual French fries becoming identifiable as the video 114 progresses. Based on these observations, the activity identification engine 104 may determine with a particular level of confidence that the user 124 is using the identified kitchen knife to manually slice whole potatoes into French fries on a one-by-one basis. For example, as illustrated, the activity identification engine 104 has determined with ninety-nine percent confidence that the user 124 is "manually cutting French fries."

Then, based on having identified the activity being performed by the user 124, the enhanced product recommendation service 102 and/or activity identification engine 104 thereof may determine related product data 206 that indicates one or more products that are usable in association with the activity and/or to produce a similar result (e.g., output) as the activity. In some instances, the related product data 206 that is generated based on analyzing the exemplary input media 200 may indicate multiple products that are usable in association with the activity and/or to generate the output 142 identified in the exemplary input media 200. In the illustrated example, the related product data 206 indicates that both a mandolin slicer and a lever operated French fry cutter are usable in association with the activity and/or to generate the output 142 identified by analyzing the exemplary input media 200.

Figure 3:
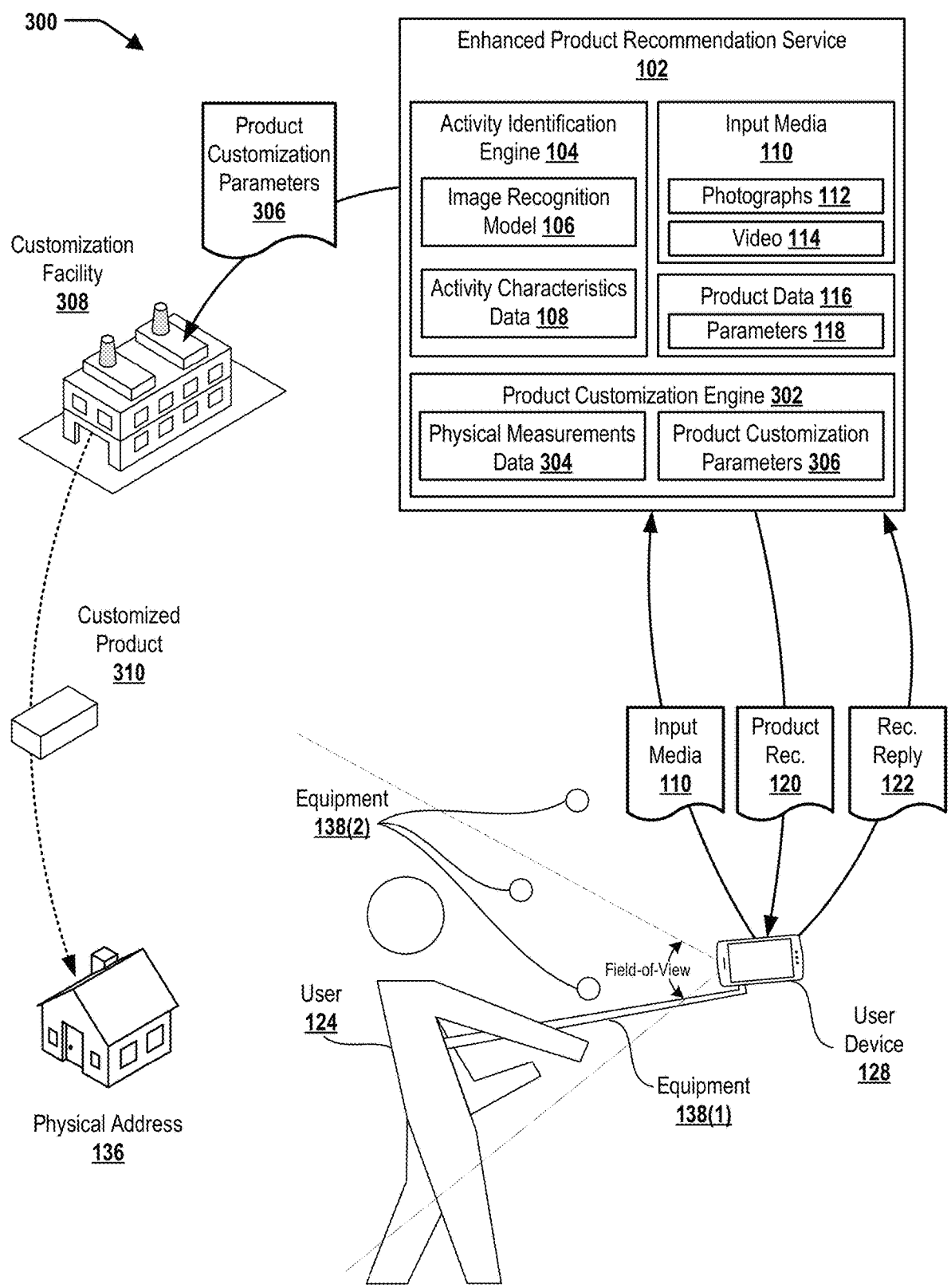
FIG. 3 illustrates an exemplary system for analyzing input media of a user engaging in an activity and determining physical measurements associated with various aspects of the activity. Based on the identified physical measurements, the system may determine product customization parameters for generating a customized product that is designed to assist the user in performing the activity.

Turning now to FIG. 3, illustrated is an exemplary system 300 for analyzing input media 110 of a user 124 engaging in an activity and determining physical measurements associated with various aspects of the activity. For example, the system 300 may identify measurements (e.g., in terms of length, width, height, etc.) of a piece of equipment 138 that the user 124 is operating to engage in the activity. As another example, the system 300 may identify measurements between one or more items that are identified within the input media 110. Based on the identified measurements, the system 300 may determine product customization parameters 306 for generating a customized product 310 that is designed to assist the user 124 perform the activity.

For purposes of the discussion of FIG. 3, the user 124 is shown to be operating first equipment 138(1) to position a user device 128 so that the user 124 is within a field of view of a camera of the user device 128. As further illustrated in FIG. 3, the user 124 is also shown to throw and catch second equipment 138(2) within the field of view of the user device 128. More particularly, in FIG. 3 the user 128 is shown as holding a selfie stick (e.g. the first equipment 138(1)) between a left arm and a torso in order to position the user device 128 for taking a "selfie" while concurrently "juggling" three balls (e.g., the second equipment 138(2)). Exemplary user devices include, but are not limited to, smart phones, tablet computers, laptop computers, virtual assistant devices, or any other type of electronic device that is suitable for observing the user 124 engage in an activity and/or receiving a product recommendation 120.

The system 300 may include a version of the enhanced product recommendation service 102 which comprises a product customization engine 302 for generating the product customization parameters 306. As illustrated, the enhanced product recommendation service 102 may receive the input media 110 from the user device 128 and may then analyze the input media 110 in accordance with various techniques described in relation to FIGS. 1 and 2. For example, in the illustrated scenario, the enhanced product recommendation service 102 may identify the first equipment 138(1) and, based thereon, determine some aspects of the activity being performed by the user 124 (e.g., that the user 124 is taking a "selfie"). The enhanced product recommendation service 102 may also identify the second equipment 138(2) and, based thereon, determine other aspects of the activity being performed by the user 124 (e.g., that the user 124 is attempting to take a "selfie" of himself juggling).

The enhanced product recommendation service 102 may deploy the product customization engine 302 to analyze the activity being performed by the user 124 within the input media 110 and identify various aspects of the activity that can be improved upon by specifically designing a product to assist with the activity. For example, in the illustrated scenario, the product customization engine 302 may determine that the range of motion of the left hand of the user 124 is restricted as compared to the right hand of the user 124. The product customization engine 302 may further determine that the cause of this restricted range of motion is the way that the user 124 is holding the first equipment 138(1) (e.g., awkwardly squeezing the selfie stick between the left arm and the torso). As described in more detail with regard to FIG. 4B, the product customization engine 302 may then determine product customization parameters 306 for generating a custom product 310 that mitigates one or more aspects of the activity being performed by the user 124. For example, based on observing that the manner in which the user 124 is holding the first equipment 138(1) results in some inadvertent difficulty (e.g., the restricted range of motion), product customization parameters 306 may be determined for generating a customized product 310 that eliminates the need for the user 124 to hold the first equipment 138(1) in order to position the user 124 within the field of view of the user device 128.

The product customization engine 302 may further analyze the input media 110 to generate physical measurements data 304 in association with various aspects of the activity being performed by the user 124. For example, in the illustrated scenario, the product customization engine 302 may determine a length measurement association with the first equipment 138(1). Additionally, or alternatively, the product customization engine 302 may determine a distance measurement between two or more identified items. For example, a distance between various pieces of the second equipment 138(2) can be determined. In various implementations, the product customization parameters 306 may be determined based at least in part on the physical measurements data 304. For example, in the illustrated scenario, the product customization engine 302 may observe that the individual pieces of second equipment 138(2) exist and then reenter the field of view of the user device 128 toward the top of their trajectory. Therefore, the product customization engine 302 may generate product customization parameters 306 for a customized "selfie-stick" that is relatively longer than the "selfie-stick" the user 124 is observed to operate in the input media 110 so that the second equipment 138(2) remains visible within the field of view of the user device 128 throughout the user 124 performing the activity.

The product customization parameters 306 may then be transmitted to a customization facility 308 for generating the customized product 310 that is specifically designed by the enhanced product recommendation service 102 based on observing the user 124 perform an activity. In some implementations, a product recommendation 120 may be generated to recommend the customized product 310 to the user 124 and/or to inform the user 124 of various aspects of the customized product 310. For example, the product recommendation 120 may include a graphical representation of the customized product 310 (which may be a computer rendered representation using machine learning techniques described herein prior to the customized product 310 being physically manufactured). The product recommendation 120 may further include descriptive details of how the customized product 310 is designed to improve the ability of the user 124 to perform the observed activity.

As illustrated, the product recommendation 120 may be transmitted from the enhanced product recommendation service 102 to the user device 128. Then, responsive to user input received in association with the product recommendation 102, a recommendation reply 122 may be transmitted from the user device 128 back to the enhanced product recommendation service 102 with an indication as to whether the user 124 would like to generate an order for the customized product 310. Ultimately, the customization facility 308 may be caused or otherwise instructed to manufacture the customized product 310 and furthermore to deliver the customized product 310 to a physical address 136 associated with the user 124. In some implementations, the enhanced product recommendation service 102 may cause the customized product 310 to be shipped to the physical address 136 preemptively (e.g., without sending a product recommendation 120 to the user 124 and receiving the recommendation reply 122 from the user 124).

Figure 4A:
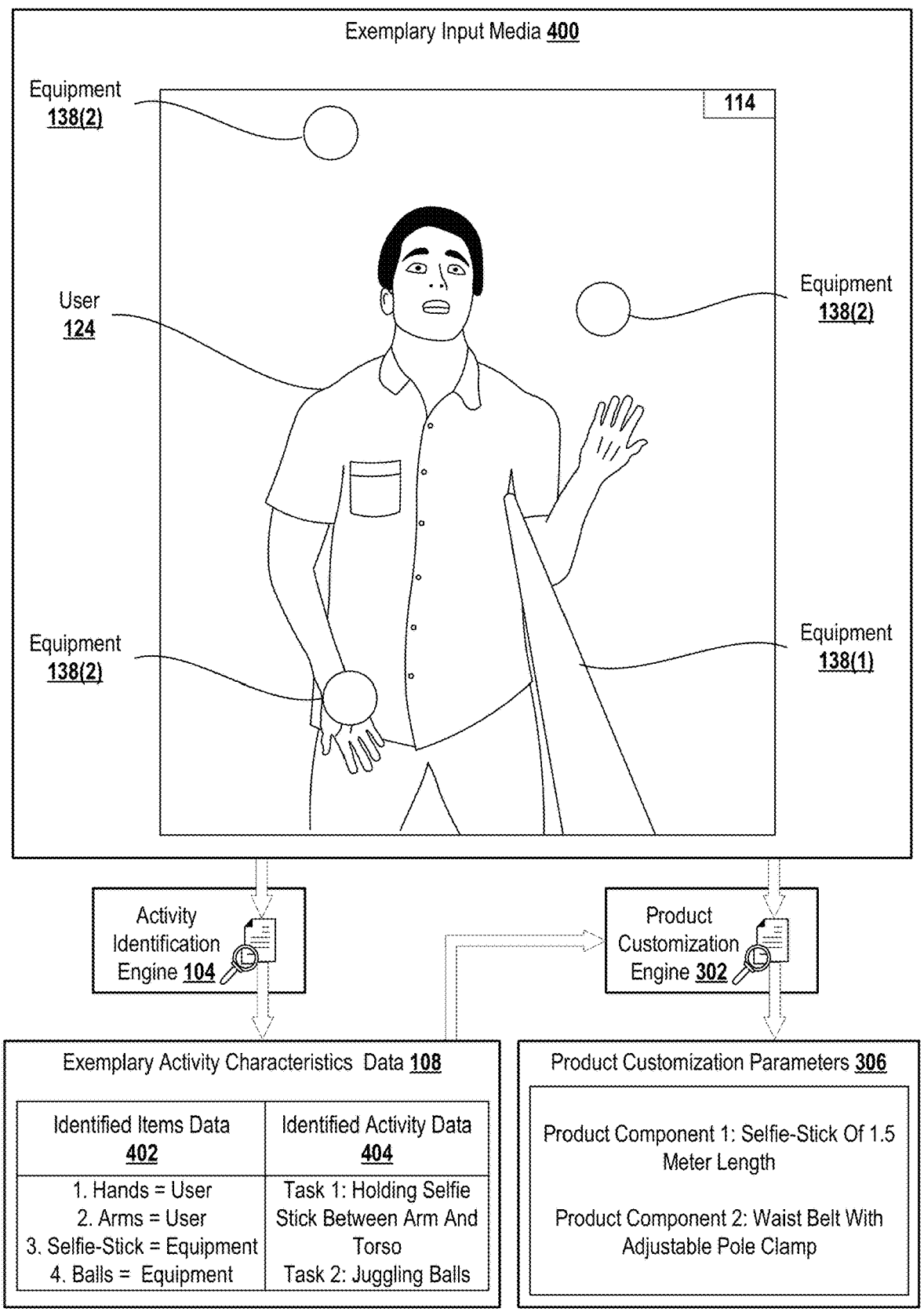
FIG. 4A illustrates exemplary input media that is suitable for analysis by an enhanced product recommendation service to determine exemplary product customization parameters for generating a customized product that is designed to assist the user in performing an activity being performed in the exemplary input media.

Turning now to FIG. 4A, illustrated is exemplary input media 400 that is suitable for analysis by the enhanced product recommendation service 102 and/or one or more components thereof to determine exemplary product customization parameters 306. As illustrated, the exemplary input media 400 graphically represents the user 124 holding a "selfie-stick" between a left arm and a torso while concurrently juggling three balls. In this example, the activity identification engine 104 analyzes the exemplary input media 400 which may include video 114 that is generated by user device 128. By deploying machine learning techniques to analyze the video 114 using the image recognition model 106, the activity identification engine 104 is able to identify various items to generate identified items data 402. The activity identification engine 104 may classify and/or label various identified items. As illustrated, the identified items data 402 includes labels that are individually associated with hands of the user 124, arms of the user 124, a selfie-stick, and the three identified balls. As further described above, the activity identification engine 104 may generate identified activity data 404 that indicates one or more activities that the user 124 is performing. For example, as illustrated, the identified activity data 404 indicates that the user is performing a first task of holding the selfie-stick between an arm and a torso while concurrently performing a task activity of juggling the three identified balls.

In various implementations, the product customization engine 302 may receive and analyze the exemplary activity characteristics data 108 and/or the exemplary input media 400 in order to generate product customization parameters 306. The product customization parameters 306 may indicate one or more components which may be combined to generate the customized product 310. For example, as illustrated, the product customization parameters 306 indicate that the customized product 310 may be generated by combining a first component that is a selfie-stick of one and one-half meters in length as well as a second component that is a waist belt with an adjustable pole clamp.

Figure 4B:
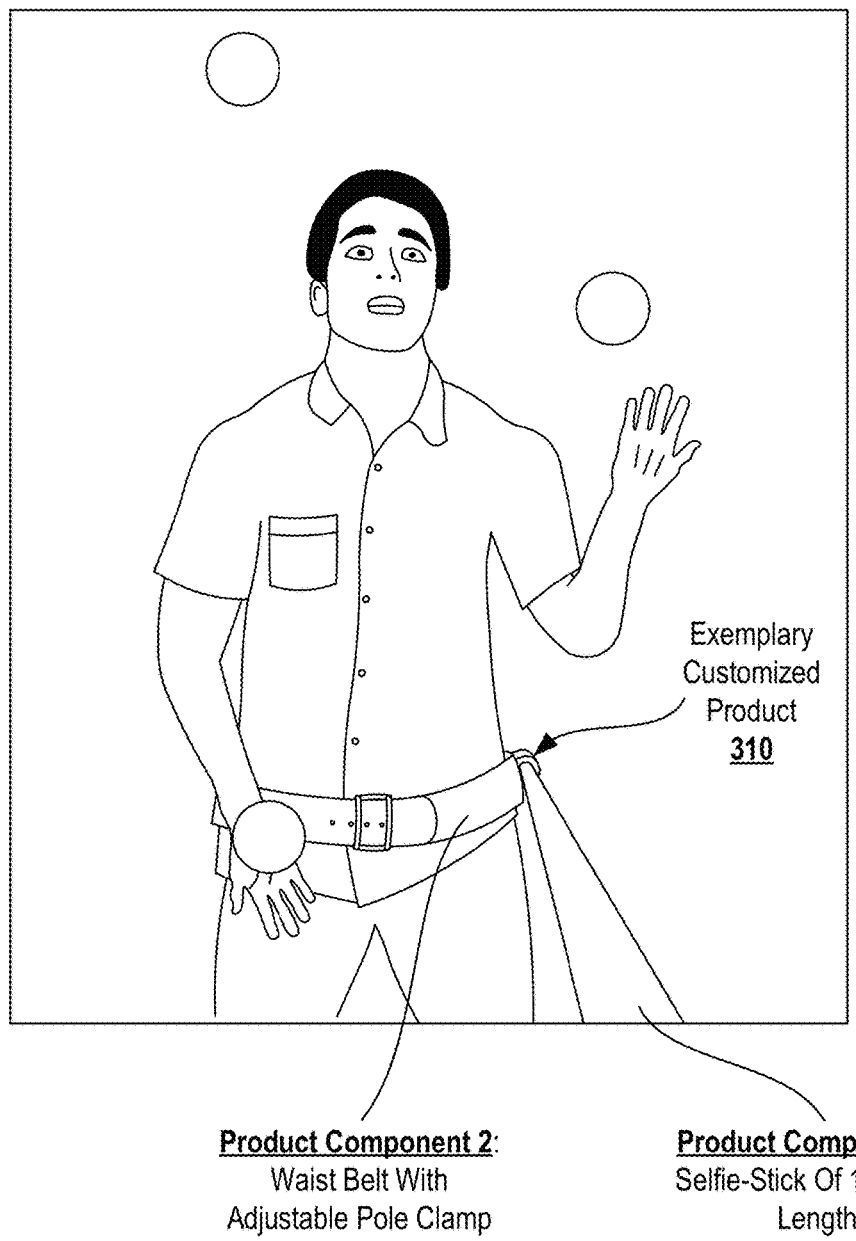
FIG. 4B illustrates an exemplary customized product that is specifically designed by the enhanced product recommendation service based on an analysis of the exemplary input media discussed in relation to FIG. 4A.

Turning now to FIG. 4B, illustrated is an exemplary customized product 310 that specifically corresponds to the scenario discussed in relation to FIG. 4A. In various implementations, the product customization parameters 306 may be configured to enable the user 124 to perform substantially the same activity observed from analyzing the exemplary input media 400 while eliminating a need of the user 124 to perform one or more sub-activities of the observed activity. For example, in the specific but nonlimiting scenario illustrated in FIGS. 4A and 4B, the exemplary customized product 310 enables the user 124 to perform the activity of juggling the three balls while holding a user device 128 in an optimal position for taking a "selfie" photograph and/or video but without having to perform the first identified activity of holding the "selfie" stick between the left arm and the torso. In particular, as illustrated, the exemplary customized product 310 is shown to be a combination of a first product component that the user 124 may wear around his waist. The illustrated exemplary customized product 310 is shown to further include a second product component that can be affixed to the first product component and to the user device 128 (not shown) to enable the user 124 to maintain the user device 128 in a position that is suitable for taking the "selfie" photographs and/or video without having to awkwardly hold the "selfie" stick as observed in the exemplary input media 400.

In some implementations, the enhanced product recommendation service 102 may generate a computer-generated-image of the customized product based on the product customization parameters. For example, the image of the user 124 engaging in the activity that is shown in FIG. 4B may be a computer-generated-image that includes a computer rendering of the customized product 310. Then, the enhanced product recommendation service 102 may transmit the computer-generated-image of the customized product to the user 124 within the product recommendation 120.

Figure 5:
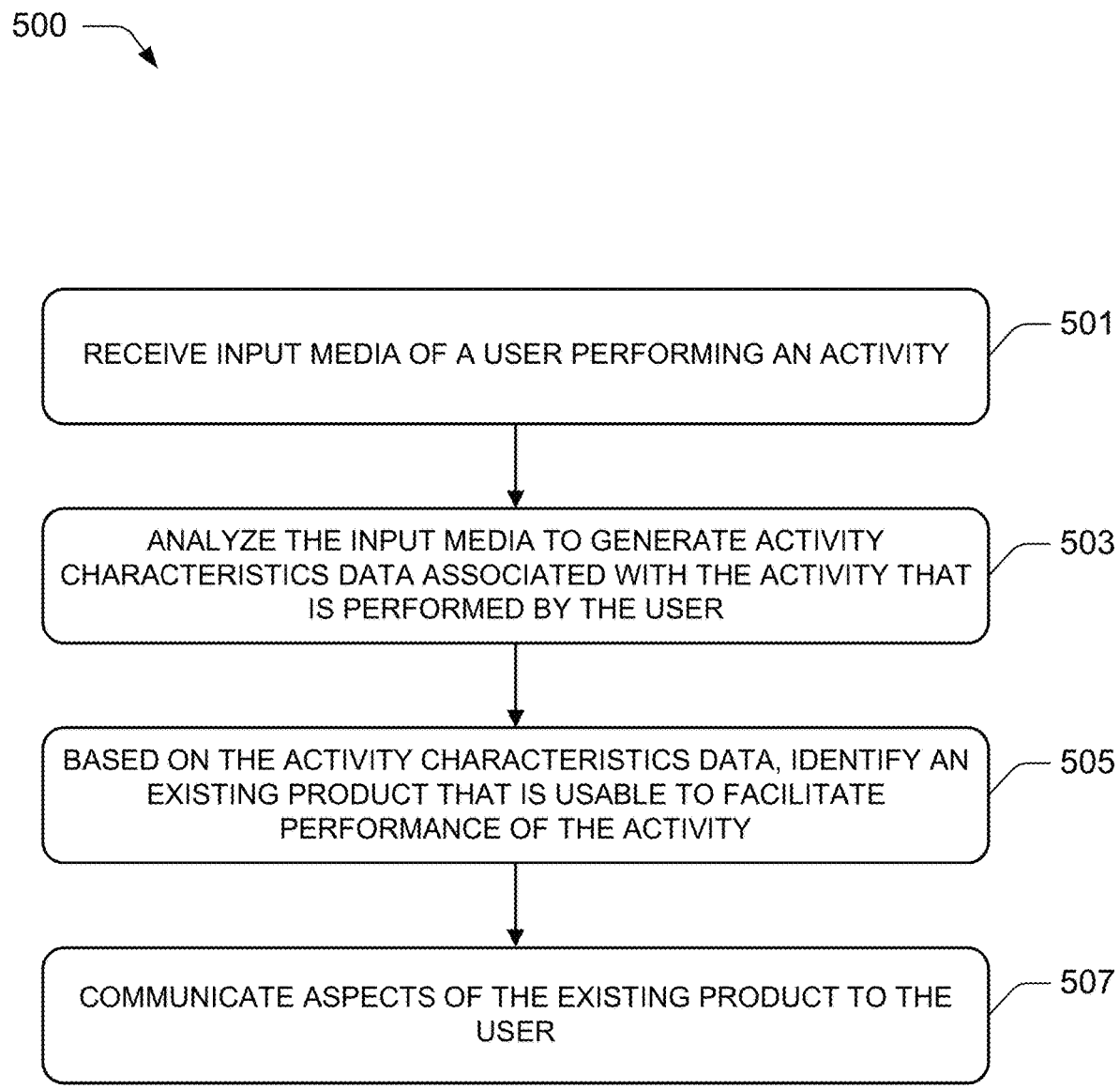
FIG. 5 illustrates an example process of analyzing input media to identify an activity being performed by a user and, based thereon, identifying one or more existing products that facilitate performance of the identified activity.
Figure 6:
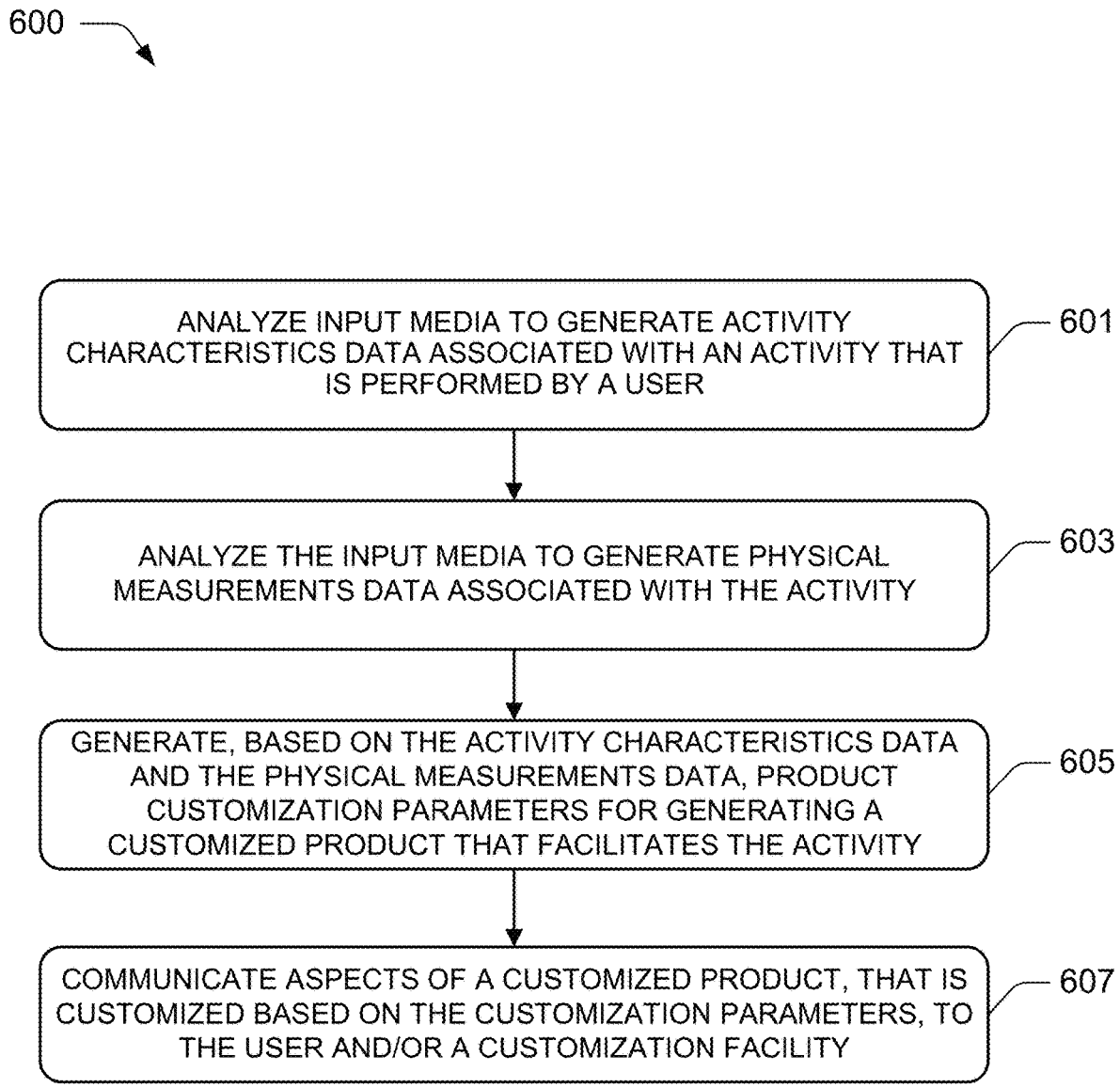
FIG. 6 illustrates an example process of analyzing input media to generate activity characteristics data associated with an activity and physical measurements data associated with the activity and, based thereon, to generate product customization parameters for generating a customized product that facilitates performance of the activity.

FIGS. 5 and 6 illustrate flow diagrams in association with example processes 500 and 600 which are described with reference to FIGS. 1-4B. The processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

FIG. 5 illustrates an example process 500 of analyzing input media to identify an activity being performed by a user and, based thereon, identifying one or more existing products that facilitate performance of the identified activity.

At block 501, a system may receive input media 110 of a user 124 engaging in an activity. Exemplary input media may include a graphical representation of the user performing the activity such as, for example, photographs 112 and/or video 114 of the user 124 performing the activity. As described above, in various instances the input media 110 may be obtained from a virtual assistance device 126 that is set up within an environment (e.g., a kitchen, a woodshop, a garage, etc.) to observe the user 124. In some instances, the virtual assistance device 126 may be a smart phone device that the user 124 operates to take photographs and/or video of oneself.

At block 503, the system may analyze the input media to generate activity characteristics data associated with the activity that is performed by the user. In some implementations, the activity characteristics data indicates one or more of: task sequence characteristics that indicate a plurality of tasks that are completed by the user during performance of the activity, raw material characteristics associated with raw material(s) that are being used in performance of the observed activity, equipment characteristics associated with one or more identified items of equipment that the user is operating to perform the activity, physical measurements associated with various aspects of the activity, and/or output characteristics that indicate an output that is produced by the user during performance of the activity. In some implementations, generating the activity characteristics data includes identifying an activity that is being performed by the user. For example, an activity identification engine 104 may be deployed to identify that the user is converting whole potatoes into French fries. As another example, the activity identification engine 104 may be deployed to identify that the user is recording himself juggling (e.g., taking a juggling "selfie").

At block 505, the system may identify an existing product that is usable to facilitate performance of the activity. For example, the system may parse product data 116 to identify an existing product that is described (e.g., within a product description) as being efficient at facilitating the activity. As a specific but non-limiting example, under circumstances in which the activity that the user is performing is identified as being "converting whole potatoes into French fries," the system may parse the product data to identify a lever-operated restaurant quality French fry cutter that is described as being able to "Slice Potatoes into perfectly sized French fries faster than any other product on the market today!"

At block 507, the system may communicate aspects of the identified existing product to the user 124. For example, the system may send a product recommendation 120 to the user 124 via the virtual assistant 126 and/or the user device 128. In some implementations, the product recommendation 120 may be an audible recommendation that is played aloud to the user 124 via the virtual assistant device 126. For example, the virtual assistant device could recite: "Hello, we recently noticed that you cut eight raw potatoes into French fries and that this took you about thirty minutes. If you were to use a lever-operated restaurant quality French fry cutter that costs $30, you could have sliced the eight raw potatoes into French fries in one minute."

FIG. 6 illustrates an example process 600 of analyzing input media to generate activity characteristics data associated with an activity and physical measurements data associated with the activity and, based thereon, to generate product customization parameters for generating a customized product that facilitates performance of the activity.

At block 601, a system may analyze input media to generate activity characteristics data associated with the activity that is performed by the user. Generating the activity characteristics data includes identifying an activity that is being performed by the user.

At block 603, the system may analyze the input media to generate physical measurements data associated with the activity. In some implementations, the physical measurements data may indicate dimensions associated with an output of the activity. For example, under circumstances in which the user is slicing French fries, the system may analyze the input media to determine a nominal size of the individual French fries that the user produces. In some implementations, the physical measurements data may indicate dimensions between two or more objects that are identified within the input media. For example, under circumstances in which the user is reaching up to grab an item from an upper cabinet, the system may identify a distance between the user and the item.

At block 605, the system may generate, based on the activity characteristics data and the physical measurements data, product customization parameters for generating a customized product that facilitates the activity. For example, the product customization parameters may define product specifications for a Mandolin slicer that is specifically configured to generate French fries at a nominal size identified by analyzing the input media. As another example, the product customization parameters may define a length for a tool that is configured to enable the user to grab the item from the upper cabinet and that is made at a length that is selected based on measurements of the upper cabinet taken by analyzing the input media.

Then, at block 607, the system may communicate aspects of the customized product, that is customized based on the customization parameters, to the user and/or a customization facility. In some instances, communicating aspects of the customized product to the user may include causing the customized product to be preemptively manufactured and delivered to the user. In some instances, communicating aspects of the customized product to the user may include generating a product recommendation that includes a description and/or graphical representation of the customized product and, ultimately, transmitting the notification to the user.

Figure 7:
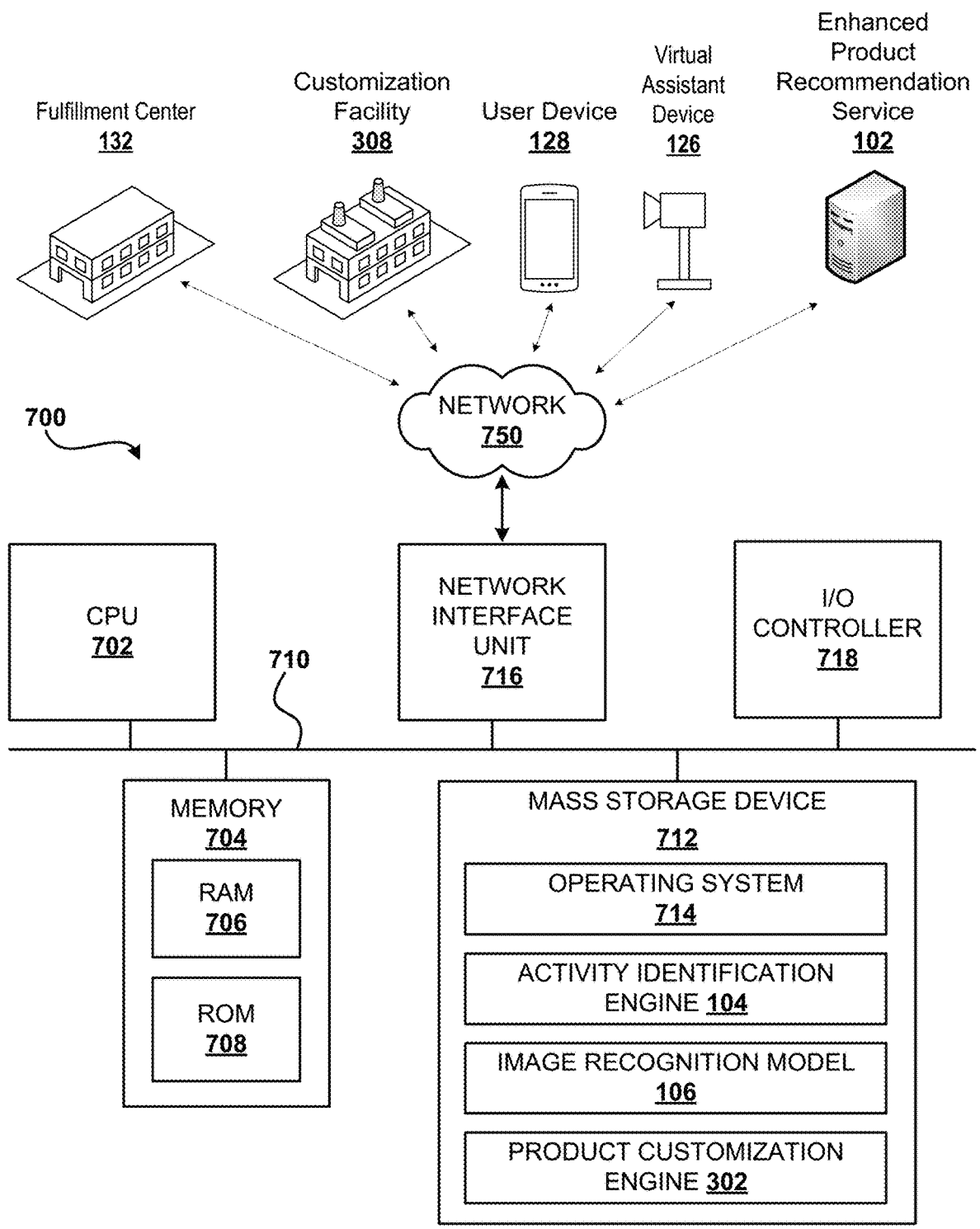
FIG. 7 shows additional details of an example computer architecture for a computer capable of executing the functionalities described herein such as, for example, those described with reference to the enhanced product recommendation service, or any program components thereof as described herein.

FIG. 7 shows additional details of an example computer architecture for a computer capable of executing the functionalities described herein such as, for example, those described with reference to the enhanced product customization service 102, or any program components thereof as described herein. Thus, the computer architecture 700 illustrated in FIG. 7 illustrates an architecture for a server computer, or network of server computers, or any other types of computing devices suitable for implementing the functionality described herein. The computer architecture 700 may be utilized to execute any aspects of the software components presented herein.

The computer architecture 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing an operating system 714, other data, and one or more application programs. The mass storage device 712 may further include one or more of the activity identification engine 104, image recognition model 106, and/or product customization engine 302.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various techniques, the computer architecture 700 may operate in a networked environment using logical connections to remote computers through a network 750 and/or another network (not shown). The computer architecture 700 may connect to the network 750 through a network interface unit 716 connected to the bus 710. It should be appreciated that the network interface unit 716 also may be utilized to connect to other types of networks and remote computer systems. The computer architecture 700 also may include an input/output controller 718 for receiving and processing input from a number of other devices, including a keyboard, mouse, or electronic stylus (not shown in FIG. 7). Similarly, the input/output controller 718 may provide output to a display screen, a printer, or other type of output device (also not shown in FIG. 7). It should also be appreciated that via a connection to the network 750 through a network interface unit 716, the computing architecture may enable the enhanced product recommendation service 102, the virtual assistant device 126, the user device 128, the customization facility 308, and/or the fulfillment center 132 to communicate with one another.

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method, comprising:
capturing, by a camera of a virtual assistant device, input media that includes a graphical representation of a user performing an activity;
generating, by the virtual assistant device, activity characteristics data by processing the input media using a trained image recognition model configured to automatically identify the activity and at least one characteristic of the activity, the activity characteristics data defining:
  task sequence characteristics that indicate a plurality of tasks that are performed by the user during performance of the activity; and
  output characteristics that indicate an output that is produced by the user resulting from performance of the activity;

determining, by the virtual assistant device, a first duration of time indicating an amount of time spent by the user during the performing the activity based on the input media;
determining, by the virtual assistant device, parameters for a product based on the activity characteristics data, the product being usable for completing the activity without performing at least one of the plurality of tasks and in a second duration of time that is less than the first duration of time;
responsive to determining the parameters for the product based on the activity characteristics data:
communicating, by virtual assistant device, a message to a device disposed with the user, the message specifying the product and describing a difference between the first and second durations of time; and
initiating, by the virtual assistant device, purchase of the product without input from the user.

2. The computer-implemented method of claim 1, wherein the activity characteristics data further defines raw material characteristics that indicate one or more raw materials that are converted via performance of the activity.

3. The computer-implemented method of claim 2, wherein determining the parameters for the product is performed based at least in part on the raw material characteristics and the output characteristics.

4. The computer-implemented method of claim 1, wherein the product is a customized product that is designed to assist the user in performing the activity, and wherein determining the parameters for the product includes determining product customization parameters for generating the customized product.

5. The computer-implemented method of claim 1, wherein the trained image recognition model is configured to:
identify at least one item of equipment that is used by the user during performance of the activity; and
determine one or more movements that are performed by the user with respect to the at least one item of equipment, wherein the task sequence characteristics are generated based at least in part on the one or more movements.

6. The computer-implemented method of claim 1, wherein the input media includes at least one of a photograph that is captured by the camera of the virtual assistant device or a video that is captured by the camera of the virtual assistant device.

7. The computer-implemented method of claim 1, wherein the message further comprises an indication of at least one benefit of using the product versus performing the activity as represented in the input media.

8. The computer-implemented method of claim 1, wherein the message further comprises an indication of the first duration of time and the second duration of time.

9. A system comprising:
one or more processors;
a camera; and
a memory in communication with the one or more processors, the memory having computer-readable instructions stored thereupon that, when executed by the one or more processors, cause the one or more processors to:
capture, by the camera, input media that includes a graphical representation of a user performing an activity;
generate activity characteristics data by processing the input media using a trained image recognition model configured to automatically identify the activity, the activity characteristics data defining a plurality of tasks that are performed by the user during the performing the activity;
determine a first duration of time indicating an amount of time spent by the user during the performing the activity based on the input media;
determine, based on the activity characteristics data, parameters for a product that is usable for:
completing the activity without performing at least one of the plurality of tasks;
completing the activity in a second duration of time that is less than the first duration of time; and
generating an output that results from the activity;
responsive to determining the parameters for the product based on the activity characteristics data;
communicate a message to a device disposed with the user the message specifying the product and describing a difference between the first and second durations of time; and
initiate purchase of the product without input from the user.

10. The system of claim 9, wherein the activity characteristics data indicates one or more raw materials that are converted into the output during the performing the activity.

11. The system of claim 9, wherein the trained image recognition model is configured to:
identify at least one item of equipment used by the user during the performing the activity; and
determine one or more movements that are performed by the user with respect to the at least one item of equipment, wherein the activity characteristics data is generated based at least in part on the one or more movements.

12. The system of claim 9, wherein the input media includes at least one of a photograph or a video.

13. The system of claim 9, wherein the message further comprises an indication of at least one benefit of using the product versus performing the activity as represented in the input media.

14. A computer-implemented method comprising:
receiving, by a camera of a virtual assistant device, input media that includes a graphical representation of a user performing an activity;
generating, by the virtual assistant device, activity characteristics data by processing the input media using a trained image recognition model configured to automatically identify the activity, the activity characteristics data defining a plurality of tasks that are performed by the user during the performing the activity;
determining, by the virtual assistant device, a first duration of time indicating an amount of time spent by the user during the performing the activity based on the input media;
determining, by the virtual assistant device and based on the activity characteristics data, parameters for a product that is usable for generating an output that results from the activity without performing at least one of the plurality of tasks and in a second duration of time that is less than the first duration of time;
responsive to determining the parameters for the product based on the activity characteristics data:
communicating, by the virtual assistant device, a message to a device disposed with the user, the message specifying the product and describing a difference between the first and second durations of time; and initiating, by the virtual assistant device, purchase of the product without input from the user.

15. The computer-implemented method of claim 14, wherein the trained image recognition model is configured to:
- identify at least one item of equipment used by the user during the performing the activity; and
- determine one or more movements that are performed by the user with respect to the at least one item of equipment, wherein the activity characteristics data is generated based at least in part on the one or more movements.

16. The computer-implemented method of claim 14, wherein the message further comprises an indication of at least one benefit of using the product versus performing the activity as represented in the input media.

17. The computer-implemented method of claim 14, wherein the message further comprises an indication of the first duration of time and the second duration of time.

18. The computer-implemented method of claim 14, wherein the activity characteristics data further defines one or more raw materials that are converted via performance of the activity.

19. The computer-implemented method of claim 18, wherein determining the parameters for the product is performed based at least in part on the one or more raw materials and the output that results from the activity.

20. The computer-implemented method of claim 14, wherein the input media includes a video.

* * * * *